US006836954B1

(12) United States Patent
Carli et al.

(10) Patent No.: US 6,836,954 B1
(45) Date of Patent: Jan. 4, 2005

(54) ROTOR FOR AN ELECTRONICALLY COMMUTATED MOTOR AND IMPROVED METHOD FOR THE MASS PRODUCTION THEREOF

(75) Inventors: Fabrizio Carli, Francenigo (IT); Matteo Bellomo, Moncalieri (IT)

(73) Assignee: Zanussi Elettromeccanica S.p.A., Pordenone (IT)

( * ) Notice: Subject to any disclaimer, the term of this patent is extended or adjusted under 35 U.S.C. 154(b) by 0 days.

(21) Appl. No.: 09/582,503

(22) PCT Filed: Jan. 11, 1999

(86) PCT No.: PCT/EP99/00108

§ 371 (c)(1),
(2), (4) Date: Jul. 29, 1999

(87) PCT Pub. No.: WO99/38242

PCT Pub. Date: Jul. 29, 1999

(30) Foreign Application Priority Data

| Jan. 20, 1998 | (IT) | ........................................ PN980003 U |
| Mar. 10, 1998 | (IT) | ....................................... PN980016 U |
| Oct. 6, 1998 | (IT) | ........................................ PN98A0070 |

(51) Int. Cl.[7] ............................................ H02K 15/16
(52) U.S. Cl. ...................... 29/596; 29/598; 310/154.09; 310/154.14; 310/156.16; 310/271; 310/156.29
(58) Field of Search .......................... 29/596, 598, 607, 29/732; 310/154.09, 154.12, 154.14, 154.15, 156.13, 156.12, 156.16, 156.28, 156.29, 156.31, 271

(56) References Cited

U.S. PATENT DOCUMENTS

| 4,412,145 A | * | 10/1983 | Voss et al. ............. 310/154.15 |
| 4,445,060 A | * | 4/1984 | Ruhle et al. ........... 310/154.14 |
| 4,636,107 A | * | 1/1987 | Casler et al. ................ 411/477 |
| 6,084,330 A | * | 7/2000 | Fisher et al. ................... 310/91 |

* cited by examiner

Primary Examiner—David P. Bryant
Assistant Examiner—Stephen Kenny
(74) Attorney, Agent, or Firm—Wenderoth, Lind & Ponack, L.L.P.

(57) ABSTRACT

Rotor for an electric motor that comprises a core (1), segments of a cylinder (5, 6, 7) made of magnetizable materials, a substantially cylindrical retaining wrapper (10) whose end portions are joined to at least a pair of plane elements (8, 9). The rotor also comprises first elastic means (11, 12, 13) having a length that is not smaller than the length of the core and being supported by means (2, 3, 4) that are integrally provided in the core parallelly to the axis of rotation (X) of the rotor, which interfere with contiguous longitudinal edges of the segments of a cylinder so as to keep said segments circumferentially spaced from each other. In a preferred manner, the rotor also comprises second elastic means (21–26) which are adapted to make up for the longitudinal and radial plays of the various parts of the rotor so as to ensure that the outer surface of the segments of a cylinder keeps in contact with the inner surface of the wrapper. The invention further relates to a method for producing the rotor. Use: electronically commutated motors, eg. used to drive hermetic refrigerant compressors. Advantages: facilitates mass production, with a high quality-to-cost ratio.

8 Claims, 5 Drawing Sheets

ROTOR FOR AN ELECTRONICALLY COMMUTATED MOTOR AND IMPROVED METHOD FOR THE MASS PRODUCTION THEREOF

DESCRIPTION

The present invention refers to a rotor for electronically commutated motors.

Electronically commutated motors are becoming increasingly poplar in many applications owing to the kind of efficiency and rpm-adjustment easiness that they usually offer.

Brushless-type electronically commutated motors are for instance being used to drive hermetic compressors of household refrigeration appliances, further to industrial equipment applications, in view of reducing the energy usage thereof.

A rotor for electronically commutated motors of this land, as well as: the methods and the equipment to produce it, is the subject of a number of a patent publications. In particular, U.S. Pat. No. 5,040,286 and U.S. Pat. No. 5,237,737 desclose a substantially closed rotor with a cylindrical core of magnetic steel laminations, a plurality of magnetizable sintered segments in the form of segments of a cylinder that have approximately the same length as said core and are adapted to be adhesive-bonded on to the outer surface thereof, a retaining wrapper obtained from a welded tube of non-magnetic stainless steel, and terminal closing rings made of aluminium.

From EP-A-0 459 355 a rotor for at electronically commutated motor is also known where circumferential direction pressing members are interposed between a plurality of segment-shaped permanent magnets having the different poles and a die-casting material is filled into gaps where the the said pressing members are accomodated. No teaching is made in this reference concerning the insertion of a non-magnetic sleeve around the outer peripheries of the permanent magnets.

The above cited retaining wrapper has an inside diameter that is smaller than the outside diameter of the rotor sub-assembly formed by the core and the magnetizable segments, as well as larger than the outside diameter of said terminal closing rings.

The drawbacks connected with these prior-art solutions derive mainly from the large dimensional tolerances of the magnetizable segments, so that the pressure exerted by the retaining wrapper is subject to considerable variations and the adhesive, which among other things needs quite a long time for hardening must be applied in a particularly careful manner in order to ensure that it duly fills up the gaps or small sockets that are specially provided to that purpose. Furthermore, the ultimate shape of the rotor, as defined by the outer surface of the retaining wrapper, owing to the fact that the latter must at least partially follow the actual shape of the magnetizable segments, only seldom turns out to comply with the theoretical, ie. cylindrical one in practice, which introduces a few balancing problems.

All these drawbacks may quite easily pile up to constitute a considerable problem when the rotors have to be produced to as high output volumes as several thousands pieces per day, such as for instance in the case of motors used to drive the hermetic compressors of household refrigeration appliances. As a matter of fact, under these conditions it proves quite a difficult task 10 combine high quality and reduced production costs.

In view of doing away with some of these drawbacks, innovative design solutions have been developed by this same Applicant concerning the rotor of an electronically commutated brushless-type motor and disclosed in the Italian utility model applications nos. PN98U000003 filed on Jan. 20, 1998 and PN98U000016 filed on Mar. 10, 1998, whose contents are fully incorporated here.

It is a purpose of the present invention to provide a rotor of an electronically commutated motor, which may even be of a type differing from the brushless one, which is fit for mass production and, at the same time, optimizes the features; that are claimed in the above cited Italian utility model applications.

A further purpose of the present invention is to provide a method enabling such a rotor to be mass produced to high quality standards, at reduced production costs and with the use of relatively simple tools and equipment.

These and further aims are reached when the rotor and the method to produce it have the features and characteristics as recited in the appended claims.

The invention will anyway be more readily understood and appreciated from the description of some preferred embodiments thereof which is given below by way of non-limiting example with reference to the accompanying drawings, in which FIG. 1 is a simplified exploded view of a first embodiment of the rotor of an electronically commutated motor of the brushless type.

Figure 1:
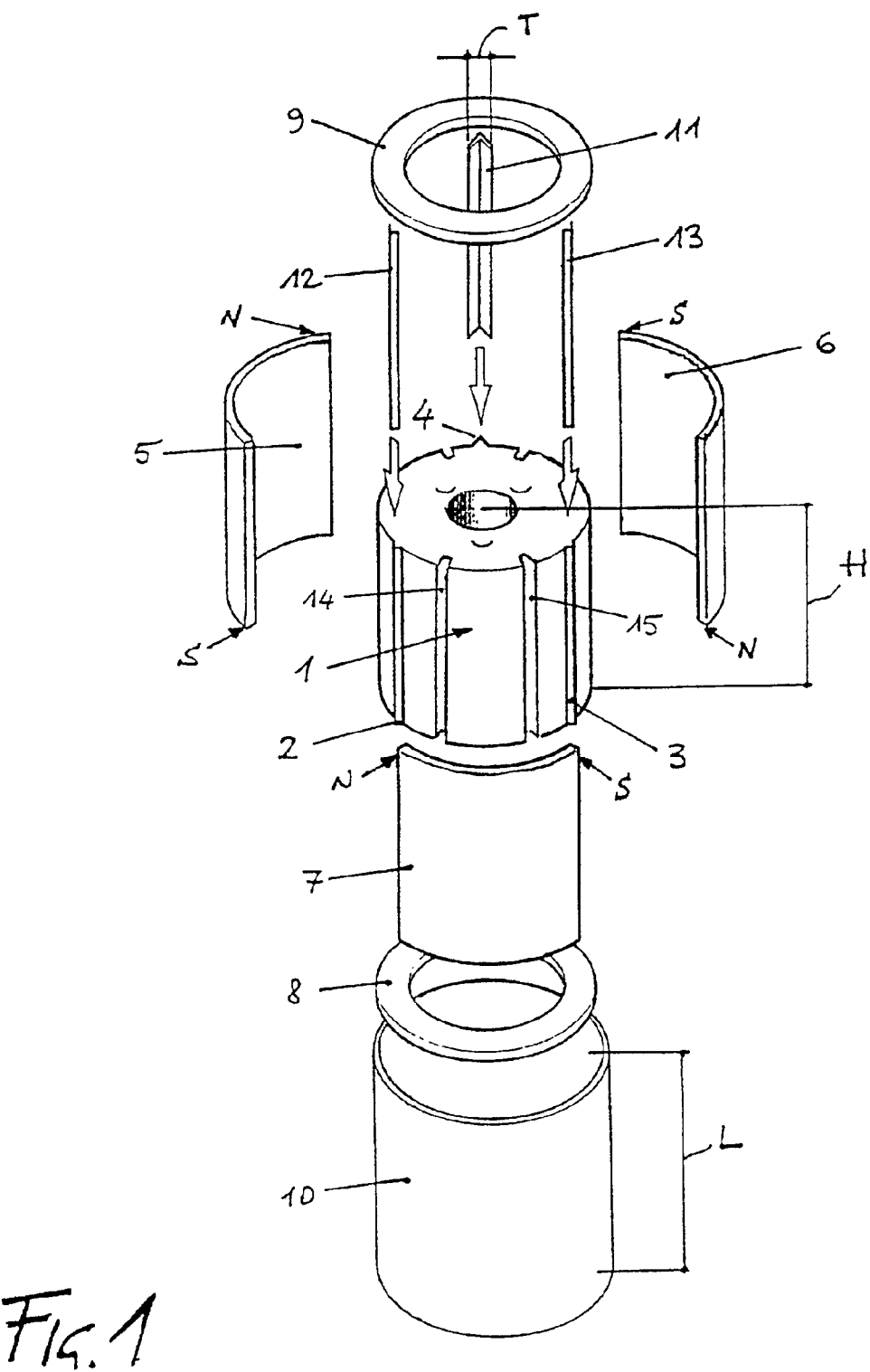
Figure 2:
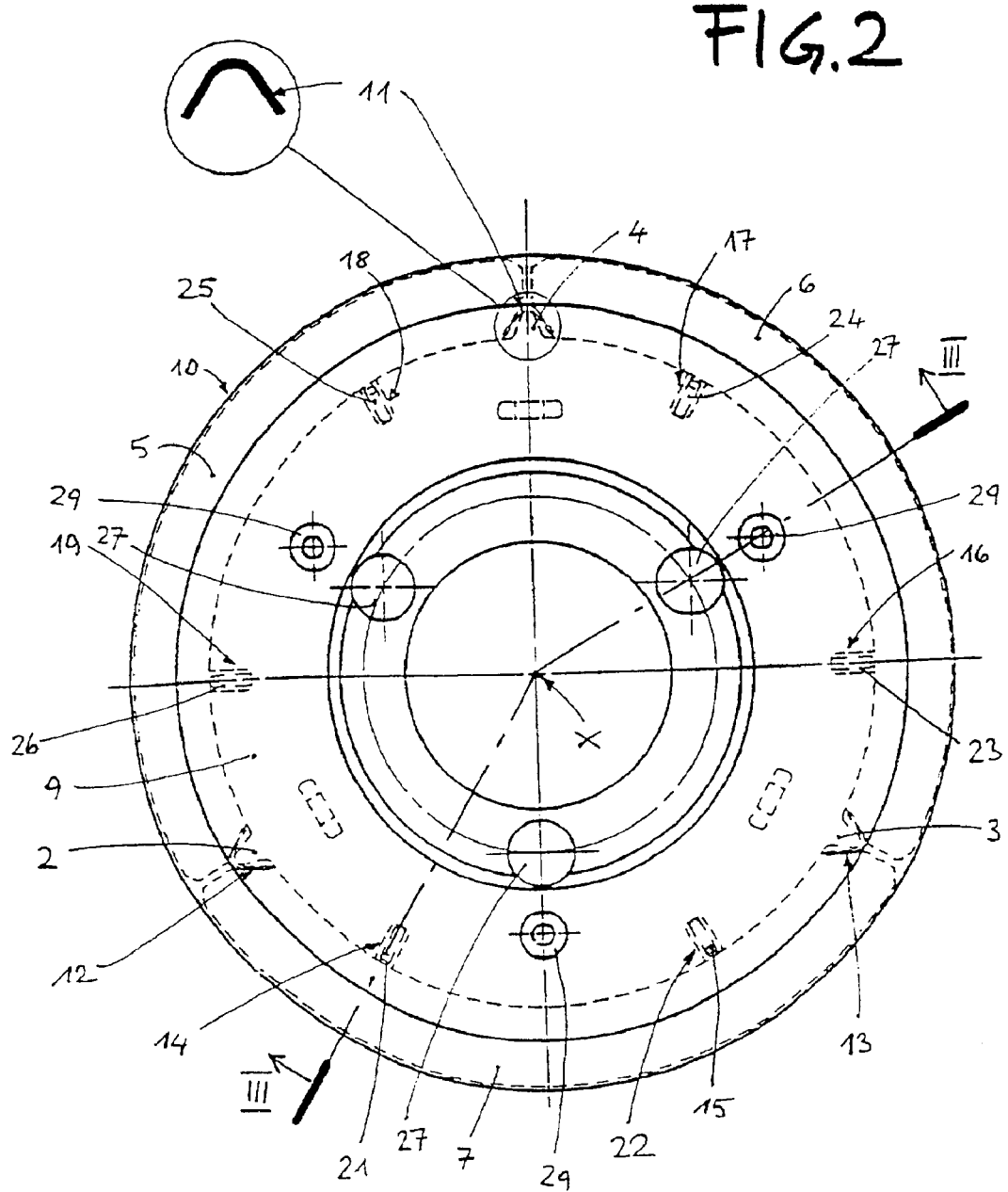
FIG. 2 is a view of the rotor of FIG. 1, as seen according to the axis of rotation thereof.
Figure 3:
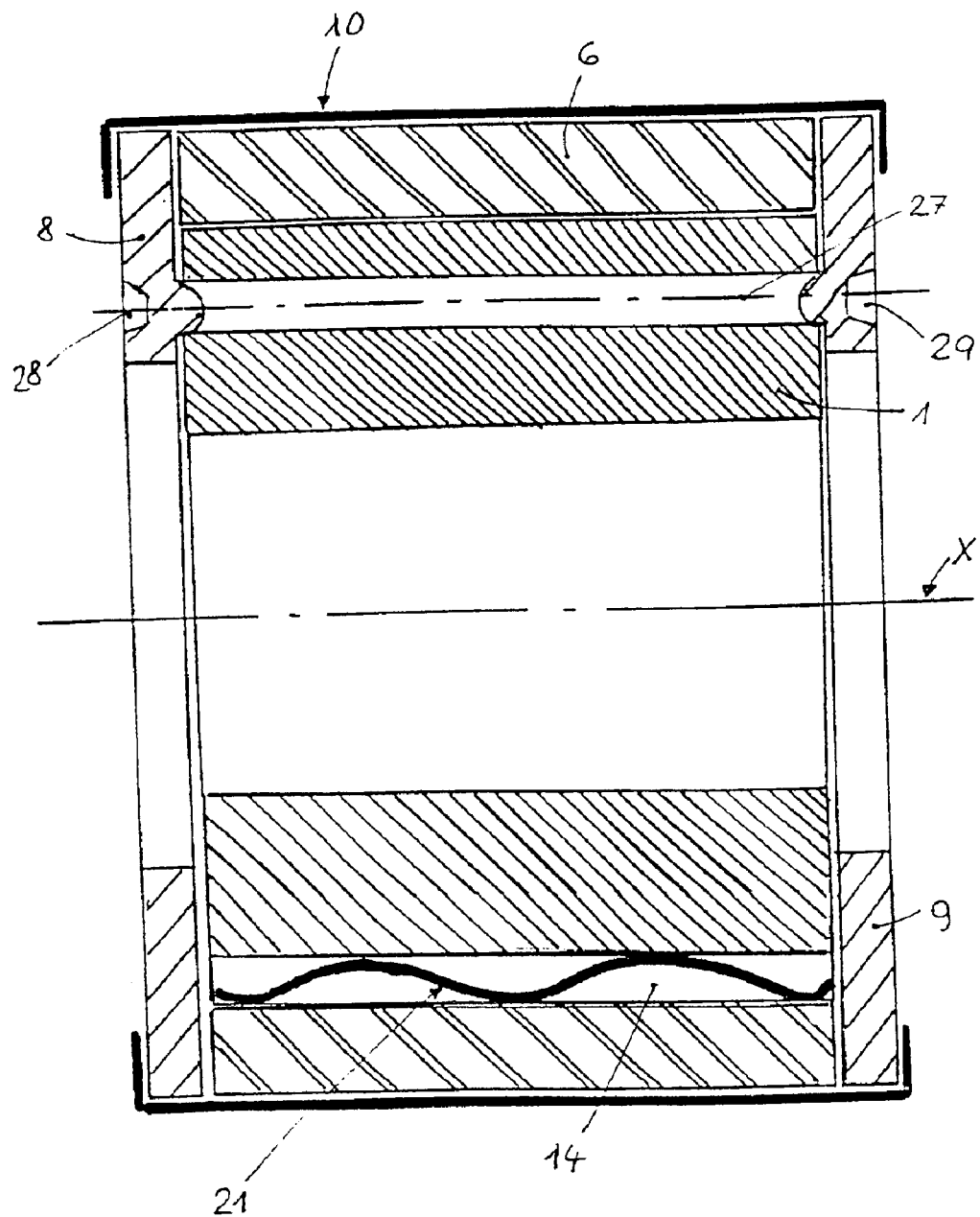
FIG. 3 is a view of the same rotor as seen along the cross-sectional line III—III of FIG. 2, wherein some parts are however illustrated in a simplified manner.

As illustrated in FIG. 2 and, albeit in a more simplified manner, also in FIGS. 1 and 3, in a first preferred embodiment a cylindrical stack of magnetic laminations forms the substantially cylindrical core 1 of a rotor, adapted to be joined with a shaft (not shown) which, in the case that the rotor is part of a brush-less motor intended for driving a hermetic refrigerant compressor for refrigeration appliances, is in a generally known manner a common shaft for both the motor and the compressor. Each lamination is punched in such a manner as to ensure that three radial protrusions, for instance in the shape of a V, and six longitudinal notches with a substantially rectangular shape are provided along the periphery thereof, in addition to the usual notches and perforations that are provided to handling and centering purposes. The core 1, which is obtaining by stacking a plurality of laminations, is in this way provided with three longitudinal prismatic ribs 2, 3 and 4, spaced at 60°-angles from each other, as well as cylindrical channels 27. Only the grooves 14, 15 provided between the longitudinal fibs 2, 3 are shown in FIG. 1, whereas also the grooves 16, 17 and 18, 19 provided between two other pairs of ribs 3, 4 and 4, 2, respectively are shown in FIG. 2.

The rotor further comprises:

three segments of a cylinder 5, 6 and 7, which are made of a magnetizable material, preferably a sintering material for permanent magnets, as this is largely known to those skilled in the art. As this is explained to a greater detail farther on in this description, said segments of a cylinder 5, 6 and 7 are adapted to be fixed to the outer surface of the core 1 so as to form a so-called rotor sub-assembly. For this reason, each one of said segments of a cylinder 5, 6 and 7 has an inside diameter that is substantially the same as the diameter of the outer surface of the core 1, in the zones comprised between the longitudinal ribs 2, 3 and 4, and an amplitude that is slightly less than 120°. Furthermore, the longitudinal edges thereof are provided with bevels that are respectively oriented towards the axis of rotation X and the exterior of the rotor (see FIG. 2);

three spring clips 11, 12 and 13, made out of music steel strips, that are called centering springs in this description. As clearly shown in the enlarged-scale detail appearing in FIG. 2, which illustrates the spring clip 11 associated to the rib 4, the centering springs 11, 12 and 13 have a V-shaped cross-section corresponding to the shape of the bevels provided along the longitudinal edges of the segments of a cylinder 5, 6 and 7 facing the axis X of the rotor. Anyway, the transverse dimension T of the centering springs 11, 12 and 13 is not smaller than the width of the longitudinal ribs 2, 3 and 4 (regardless of the actual shape of such ribs) along the circumference of the core 1, whereas their length is preferably smaller than or equal to the height H of the core 1 (see FIG. 1);

two end rings 8 and 9 made of a non-magnetic metal, for instance aluminium, that are provided with centering bulges 28 and 29:

a cylindrical retaining wrapper 10, made of a non-magnetic metal, such as for instance AISI 304 steel, having a length L which is greater than the height H of the core 1 and an inside diameter that is greater than or equal to the outside diameter of the rings 8 and 9;

a plurality of corrugated spring clips, that are referred to as retaining springs and indicated at 21 through to 26 (see FIG. 2) in this description, which are made out of music steel wire. Each one of these springs is adapted to be inserted in one of said longitudinal grooves 14–19 of the core 1. FIG. 3 shows for instance the corrugated spring 21 inserted in the groove 14.

In view of producing a rotor as described above, and illustrated in FIGS. 1 to 3, a preferred method according to the present invention comprises the following phases:

1) realization of the core 1 by stacking a plurality of magnetic laminations so as to obtain the above indicated characteristics;

2) insertion of the retaining springs 21–26 in the longitudinal grooves 14–19 of the core 1;

3) obtainment of a rotor sub-assembly formed by the core 1, the retaining springs 21–26, and the segments of a cylinder 5, 6 and 7 arranged along the outer surface of the core 1. Owing to the action exerted by the retaining springs 21–26 upon the segments of a cylinder 5, 6 and 7, this phase is carried out without any use of adhesives, unlike what on the contrary happens when prior-art production methods are used, and this proves to be particularly advantageous in the case of very large output quantities, since it enables the rotor to be produced at clearly enhanced daily productivity rates;

4) insertion of the cylindrical wrapper 10 along the axis of rotation X around said rotor sub-assembly. Owing to the presence of an intentionally provided radial play, due to an inside diameter having been selected for the wrapper 10 which is greater than or equal to the outside diameter of the rotor sub-assembly, even this phase of the method according to the present invention can be carried out without encountering any particular difficulty, while again contributing to a reduction in manufacturing time requirements. The outer surface of the wrapper 10 is in this way capable of maintaining a cylindrical shape and, as a result, the rotor can be balanced in a much easier manner. In turn, the retaining springs 21–26 make up for the longitudinal and radial plays introduced by the different dimensional tolerances of the various parts. In this way, the outer surface of the segments of a cylinder 5, 6 and 7 is able to stay in contact with the inner surface of the wrapper 10, whereas the inner surface thereof may also be slightly spaced from the outer surface of the core 1. During the operation of the motor, the centrifugal force is in this way directed in the same direction as the one of the action exerted by the retaining springs 21–26, thereby minimizing the risk for the segments of a cylinder 5, 6 and 7 to break down, considering that, being these segments made of sintered metal, they have a relatively low mechanical strength;

5) insertion of the centering springs 11, 12 and 13 along the axis of rotation X (as indicated by the three parallel arrows appearing in FIG. 1) starting from an end side of the wrapper 10, so as to enable them to be supported by the ribs 2, 3 and 4 and, as this has already been described above, so as to enable them to interfere with the bevels facing the axis X of the rotor provided on the contiguous longitudinal edges of the segments of a cylinder 5, 6 and 7. A precise circumferential spacing between the segments of a cylinder 5, 6 and 7 is in this way obtained in the rotor, without any risk for said segments to come into contact with each other, said circumferential spacing playing a quite important role in enabling a high electric efficiency of the motor to be obtained;

6) insertion of the rings 8 and 9 so as to enable them to come into contact with the end portions of the core 1, without interfering with the end portions of the wrapper 10;

7) circumferential deformation of the end portions of The wrapper 10 onto the rings 8 and 9, so as to enable them to be mutually Joined by a seam-folding operation that brings about a cylindrical, substantially sealed shell around the core 1 of the rotor (in this connection, it should be pointed out that, for reasons of greater simplicity, the rotor is shown in FIG. 3 as it appears before this phase is carried out);

8) magnetization of the rotor so as to enable the contiguous longitudinal edges of the segments of a cylinder 5, 6, 7 to become opposite magnetic poles (see FIG. 1).

Figure 4:
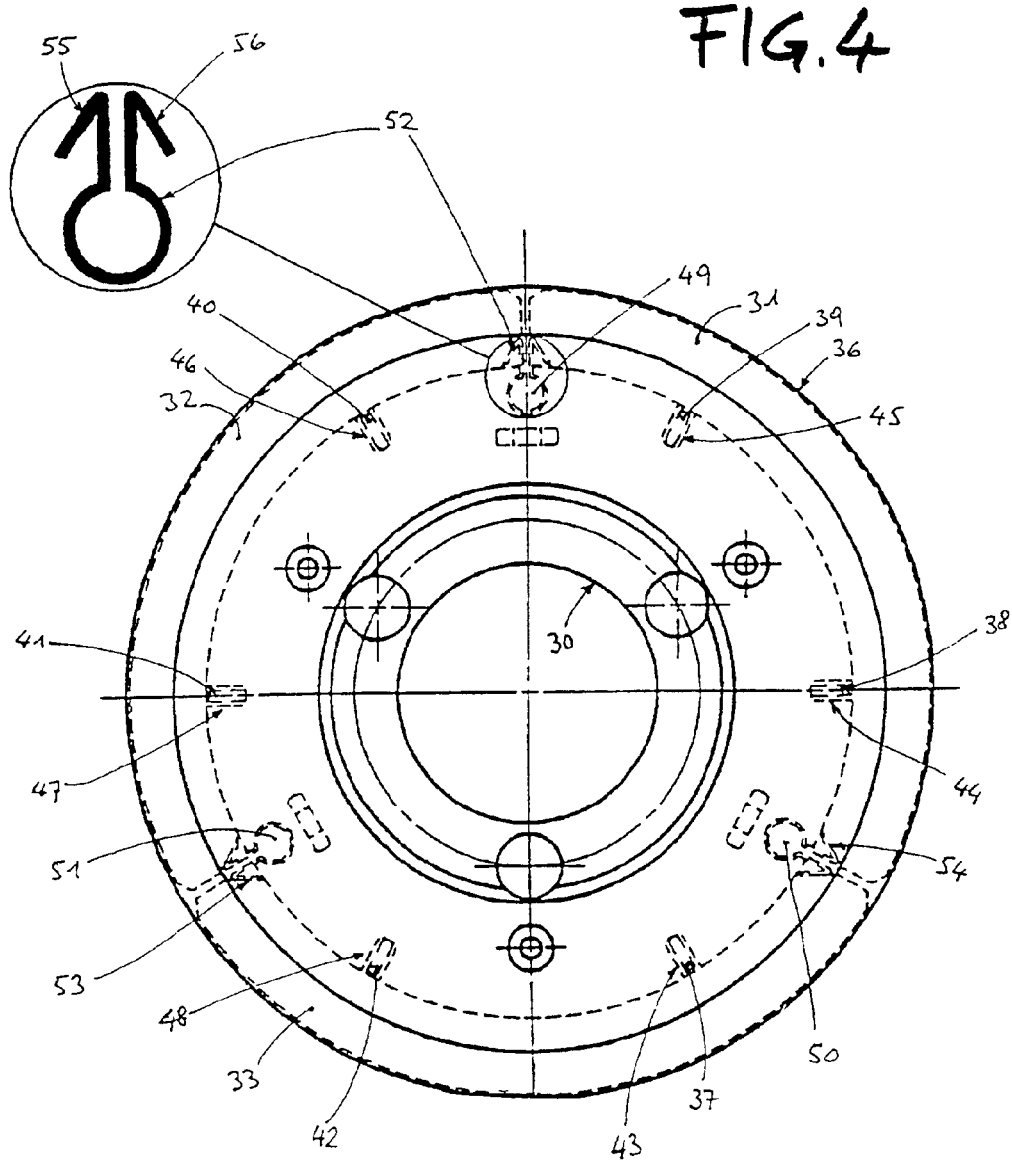
FIG. 4 is a same view as the one illustrated in FIG. 2, however referred to a second embodiment of the rotor.

A second embodiment of the rotor according to the present invention is illustrated in FIG. 4.

With respect to the afore described first embodiment, the rotor remains practically unchanged in the following features thereof:

the three segments of a cylinder, made of a magnetizable material, which are now indicated with the reference numerals 31, 32 and 33:

the two terminal rings, made of a non-magnetic material, of which only the one now indicated at 34 is shown;

the cylindrical wrapper, which is also made of a nonmagnetic metal material and is now indicated at 36;

the retaining springs, which are now indicated at 37 through to 42.

As compared with the afore described first embodiment, this second embodiment introduces following variants:

the core 30, which is still formed by a stack of magnetic laminations, is provided, further to the longitudinal grooves regularly spaced from each other by an angle of 60°, and now indicated at 43 through to 48 in the Figure, for the retaining springs 37–42, with three peripheral slots 49, 50 and 51. Said slots, that have a cross-section in the shape of substantially a Ω and are spaced from each other by an angle of 120° extend for a relatively short radial length staring from the outer surface of the core 30;

the three centering springs, watch are now indicated at 52, 53 and 54 in the Figure, have a cross-section in the shape of a Ω and are so sized as to be: able to be accomodated in the peripheral slots 49, 50 and 51 of the core 30, with the end portions thereof that are bent to a shape of a V so as to be adapted to interfere with the bevels facing the axis of the rotor that are provided along the contiguous longitudinal edges of the segments of a cylinder 31, 32 and 33. These features are evidenced in the detail illustrated to an enlarged scale in FIG. 4, which only shows the slot 49 and the therewith associated centering spring 52 with its bent end portions 55 and 56. For reasons of greater simplicity, no mention is made here of items that are equal to or unchanged with respect to the ones that have already been described in connection with the afore cited first embodiment as long as they have no direct relevance with the present invention.

The manufacturing method for this second embodiment of the rotor according to the present invention is substantially the same as the one described in connection with the afore cited first embodiment, of which it maintains the basic features and particular advantages. In particular, the insertion of the wrapper 36 around the rotor sub-assembly is facilitated by the fact that the inside diameter of the former is not smaller than the outside diameter of the latter; the longitudinal and radial plays that are introduced by the different dimensional tolerances of the various parts of the rotor are made up for by the retaining springs 37–42, which ensure that the outer surface of the segments of a cylinder 31, 32 and 33 is able to remain in contact with the inner surface of the wrapper 36; the action exerted by the bent, V-shaped ends of the centering springs 52, 53 and 54, owing to the interference thereof, ensures that a precise circumferential spacing is maintained between the segments of a cylinder 31, 32 and 33.

Figure 7:
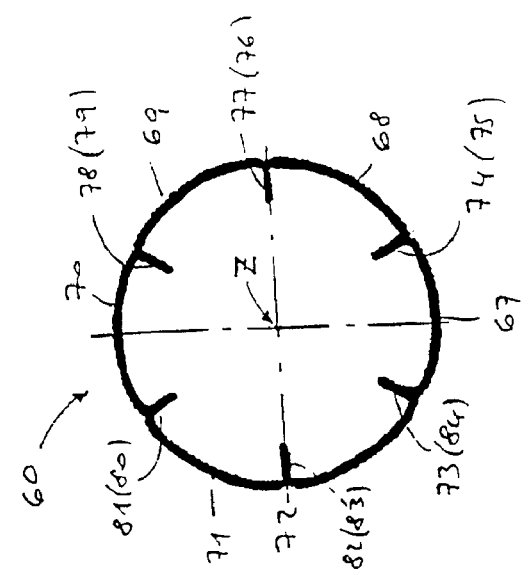
FIG. 7 is a cross-sectional view of the spring of FIGS. 5 and 6.
Figure 6:
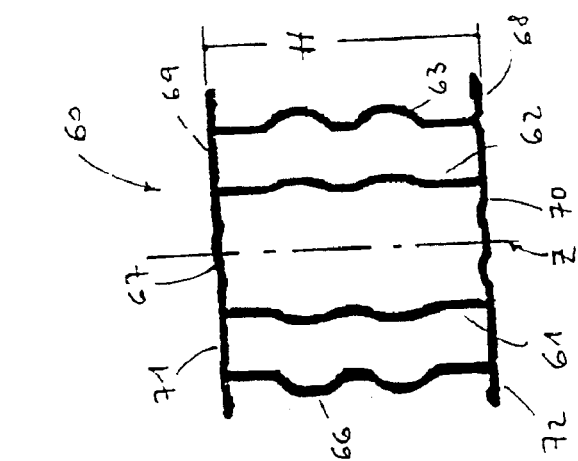
FIG. 6 is a longitudinal view of the spring shown in FIG. 5.
Figure 5:
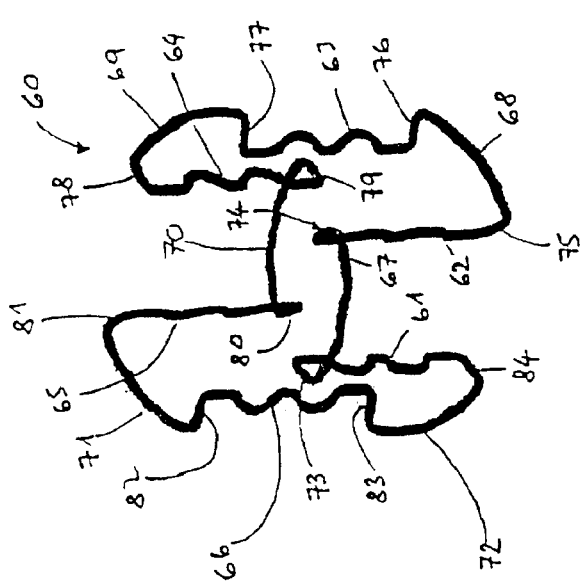
FIG. 5 is a three-dimensional view of a magnet retaining spring that may be used in both above mentioned embodiments of the rotor.

A variant of the above embodiments is illustrated in the FIGS. 5 to 7, in which the use is advantageously provided of a single retaining spring 60, made of steel music wire and shaped to a configuration of a "cylindric cage" instead of the plurality of the afore described elementary retaining springs. Said retaining spring 60 consists of:

first parallelly extending portions, indicated at 61 through to 66 in the Figures, provided in an equal number as the corresponding grooves on the periphery of the rotor core (ie. six in this particular example of embodiment)—see FIGS. 5 and 6;

second portions in the shape of arcs of a circle, and indicated at 67 through to 72 in the Figures, which are subdivided into two groups of equal number between the ends of said first portions 61–66 (ie. three plus three in this particular example of embodiment)— see FIG. 5;

short radial joining portions, indicated at 73 through to 84 in the Figures, which are provided between the ends of each one of said first portions 61–66 and the adjacent second portions 67–72 (see FIG. 7), so that they are of course provided in a number that is the double of the number thereof (ie. in the number of twelve in this example of embodiment)— see FIG. 5.

Further features of the retaining spring 60 are as follows:

both said first portions 61–66 and said second portions 67–72 are not rectilinear, but undulated, ie. a fact that increases the elastic yielding property thereof in all directions and, therefore, the capability thereof of making up for the different dimensional tolerances of the various parts (see FIGS. 5 and 6);

the length thereof (ie. the distance between the two groups of second portions 67–72) is substantially equal to the height H of the rotor core (see FIG. 5).

the radial extension of the joining portions 73–84 is smaller than the thickness of the segments of a cylinder of the rotor sub-assembly, as measured on a plane that is orthogonal to the axis of rotation thereof.

The use of a single retaining spring 60 enables all of the segments of a cylinder to be at the same time and most precisely positioned around the core. When adding this feature to the other afore cited advantages, the possibility emerges of further increasing both the manufacturing productivity and the quality of the rotor.

It will be appreciated that further embodiments and variants of the present invention, in particular as far as such features are concerned as the number as the shape of the segments of a cylinder (or any other type of magnetizable elements of the rotor sub-assembly), the centering springs, the retaining springs, the construction of the core, the method for joining the wrapper and the rings (or any other end elements that may be used), may be developed in any different manner by those skilled in the art without departing from the scope of the present invention.

What is claimed is:

1. Rotor for an electronically commutated motor that comprises:

a sub-assembly formed by a core of magnetic laminations and by a plurality of segments of a cylinder made of preferably sintered magnetizable materials positioned on the outer surface of the core, a substantially cylindrical wrapper, made of a non-magnetic material preferably an austenitic steel, surrounding said segments of a cylinder, and having an inside diameter that is not smaller than the outside diameter of the said sub-assembly, at least a pair of plane elements, in the form of rings made of a non-magnetic material, preferably aluminum, which are joined to the end portions of said wrapper at the extremities of the core by first elastic means having a length that is not smaller that the length of the core, and are supported by means that are integrally provided in the core parallel to the axis of rotation of the rotor, which are adapted to interfere with contiguous longitudinal edges of said segments of a cylinder so as to keep said segments circumferentially spaced from each other, characterized in that it also comprises second elastic means which are supported by means that are integrally provided in the said core, adapted to ensure that the outer surface of the said segments keeps in contact with the inner surface of the wrapper and are the sole means: provided in the rotor to make up for the longitudinal and radial plays of the various parts.

2. Rotor according to claim 1, characterized in that the supporting means for said second elastic means are grooves extending parallelly to the axis of rotation of the rotor and provided in a number that is equal to or a multiple of the number of the supporting means for said first elastic means.

3. Rotor according to claim 1, characterized in that said second elastic means are elementary undulated springs.

4. Rotor according to claim 1, characterized in that said second elastic means comprise a cylindric cage made of metal wire and consisting of first parallel, preferably undulated portions provided in a number equal to the supporting means thereof, second portions formed in the shape of arcs of a circle, and preferably undulated, which are subdivided into two groups of equal number between the ends of said first portions, and radial joining portions that are provided between the ends of each one of said first portions and the adjacent second portions.

5. Rotor according to claim 4, characterized in that a radial extension of said radial joining portions is smaller than the thickness of the segments of a cylinder as measured on a plane that is orthogonal to the axis rotation of the rotor.

6. Rotor according to claim 1, characterized in that the means for supporting said first elastic means substantially consist of peripherally arranged slots that are provided, regularly spaced from each, other on the outer surface of the core and have a cross-section in the shape of a "Ω", said slots being adapted to accommodate the first elastic means which are also in the shape of a "Ω" with their end portions bent to the shape of a "V" interfering with the contiguous longitudinal edges of the segments of a cylinder.

7. Rotor according to claim 1, characterized in that the end portions of the: wrapper are joined to said plane elements solely by means of a simple mechanical deformation.

8. Method for producing a rotor, comprising substantially the phases of:

making a core by stacking a plurality of magnetic laminations;

associating second elastic means to respective supporting means integrally provided on the core;

obtaining a rotor sub-assembly formed by the core, said second elastic means, and segments of a cylinder arranged along the outer surface of the core;

providing a cylindrical wrapper along an axis of rotation around said rotor sub-assembly with a radial play with respect thereto, inserting first elastic means in the respective supporting means provided integrally on the core so as to obtain a circumferential spacing of the segments of a cylinder from each other due to the first elastic means interfering with contiguous longitudinal edges of the segments of a cylinder;

inserting plane elements so as to enable them to come into contact with end portions of the core;

submitting the end portions of the wrapper and/or the plane elements to a circumferential mechanical deformation so as to enable them to mutually join to form a cylindrical, substantially sealed shell;

magnetizing the rotor so as to enable the contiguous longitudinal edges of the segments of a cylinder to become opposite magnetic poles.

\* \* \* \* \*